Feb. 23, 1937. F. KRONENBERGER 2,071,545
EGG HOLDING CONTAINER
Filed Jan. 13, 1934. 3 Sheets-Sheet 1

INVENTOR
Ferdinand Kronenberger
BY
ATTORNEY

Feb. 23, 1937. F. KRONENBERGER 2,071,545
EGG HOLDING CONTAINER
Filed Jan. 13, 1934 3 Sheets-Sheet 2
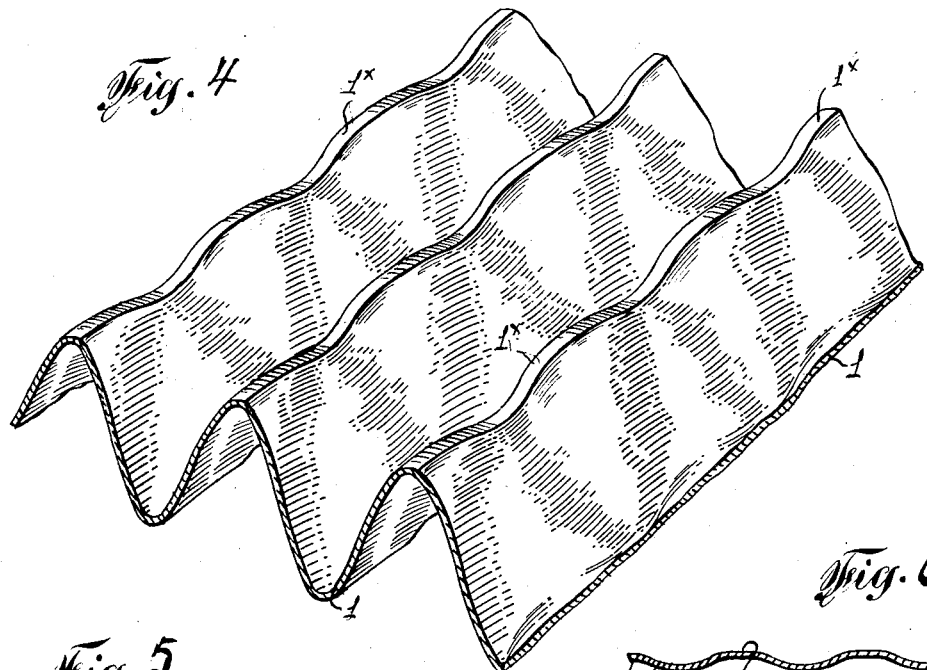
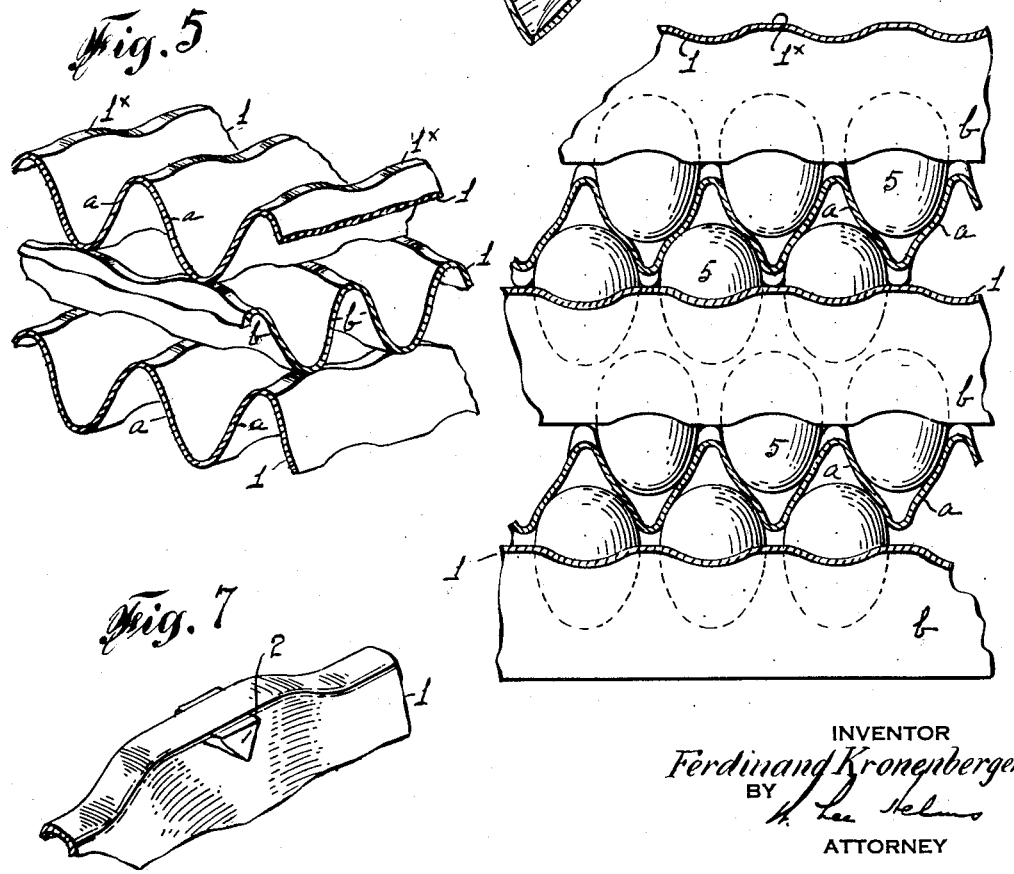
INVENTOR
Ferdinand Kronenberger
BY
ATTORNEY Feb. 23, 1937.   F. KRONENBERGER   2,071,545
EGG HOLDING CONTAINER
Filed Jan. 13, 1934   3 Sheets-Sheet 3

INVENTOR
Ferdinand Kronenberger
BY
ATTORNEY

Patented Feb. 23, 1937

2,071,545

UNITED STATES PATENT OFFICE 2,071,545

EGG HOLDING CONTAINER

Ferdinand Kronenberger, Brooklyn, N. Y.

Application January 13, 1934, Serial No. 706,481

7 Claims. (Cl. 217—26.5)

This invention relates to an egg-packing container of that type in which two superposed units are adapted to enclose and support eggs without the necessity of employing an interposed filler.

The object of the invention is to provide what may be termed a combined egg flat and filler of molded pulp or rolled fibre sheet. This filler is of simple zig-zag formation and affords on one face a plurality of parallel channels the side faces of which are laterally conformed to the curvature of the eggs received by the channels, the walls of each channel separating two contiguous underlying channels provided by said zig-zag formation of the sheet, and means being also provided for holding the thus zig-zag or "accordion" sheet formation from spreading in the handling thereof and from any undesired spreading when the eggs are received in the channels.

In the use of the device, rows of eggs are inserted in the open channels or trough-like portions of a lower unit and thereupon an upper unit is turned so that its channels or troughs lie at right angles to those of the underlying unit and its lower troughs receive the upper portions of the eggs supported by the underlying unit. The troughs are so formed that the eggs received thereby are held substantially spaced from the base of each trough irrespective of whether it be the case of a trough supporting eggs from beneath, or, that of supporting the eggs from above.

Other objects of the invention will hereinafter appear in the specification descriptive of the drawings. In the drawings:—

Fig. 4 is an enlarged fragmentary perspective view of a combined egg flat and filler construction in accordance with the invention.

Fig. 5 is a fragmentary perspective view showing three of the units in their relative positions as used in the packing of eggs.

Fig. 6 is a vertical section through an egg packing for four superposed layers of eggs showing five of the combined flat and filler units in position preparatory to applying the cover of the packing case and thereby causing compression of the assembly so that the layers of eggs are moved toward each other and are firmly seated.

Fig. 7 is an enlarged fragmentary perspective view of one unit at the top thereof, at which point the fibre sheet is turned or folded in the formation of the zig-zag trough structure.

Reference to Fig. 4 of the drawings will show the general formation of the combined flat and filler comprising the present invention, the formation being that of a sheet of fibrous material formed either by molding pulp or rolling a sheet of paper fibre in zig-zag arrangements to provide upper and lower series of troughs or channels, the preferred method being to form the structure by molding pulp.

Figure 9:
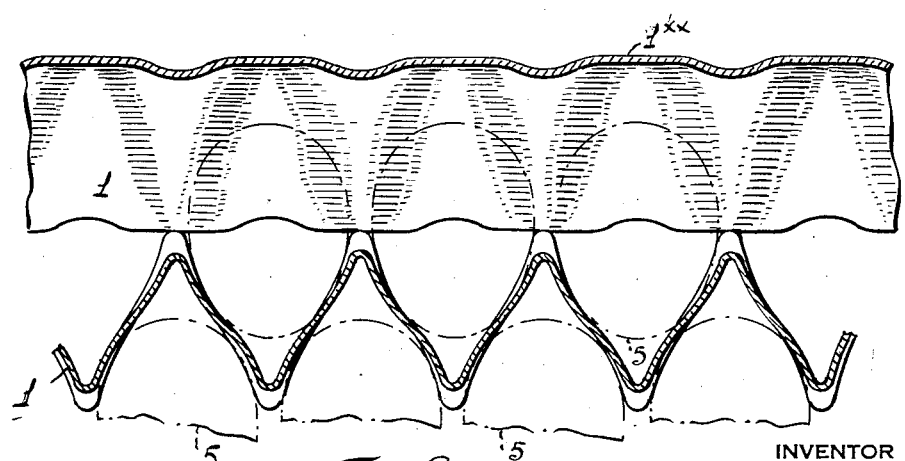
Fig. 9 is a vertical sectional view taken along the section line 9—9 in Fig. 8 looking in the direction of the arrows.

In the drawings the sheet is indicated at 1 and the troughs or channels are of such dimensions that when eggs are inserted therein the eggs will be held substantially spaced apart from the bottom of each trough or channel as shown more particularly in Figs. 6 and 9.

Figure 8:
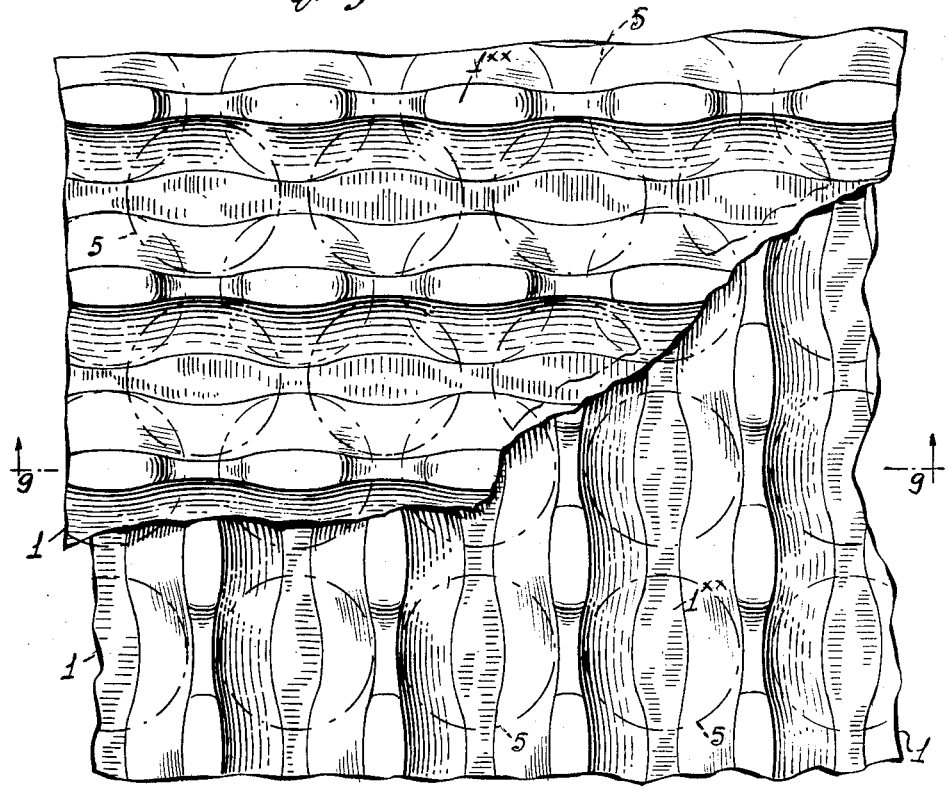
Fig. 8 is a fragmentary plan view showing two superposed units and their respective relation to the eggs supported by the lowermost unit.

As shown in Figs. 4, 8 and 9, the side walls of the troughs or channels are waved to readily conform to the curvatures of eggs placed in each trough and hold said eggs in such relationship that in a given trough individual eggs are slightly spaced apart; and the fact that the eggs of adjacent troughs are held projected a distance from the bottom of the troughs insures that the eggs in each trough will be laterally spaced an adequate distance from the eggs of underlying transverse troughs.

I prefer that the sheets in addition to their wavy channel side-face formation be formed with alternate raised and depressed portions at the plurality of parallel lines or "fold" of the sheet, that is to say, at the base or bottom of each parallel trough or channel and the apex of each inverted "trough" alternating therewith. Such formation of the trough bases enables me to provide means for resisting the spreading of the troughs, by reinforcing the sheet at the said lines of "fold" and also enables the provision of seats for the mutual abutment of the superposed units as shown in Fig. 5.

Figure 1:
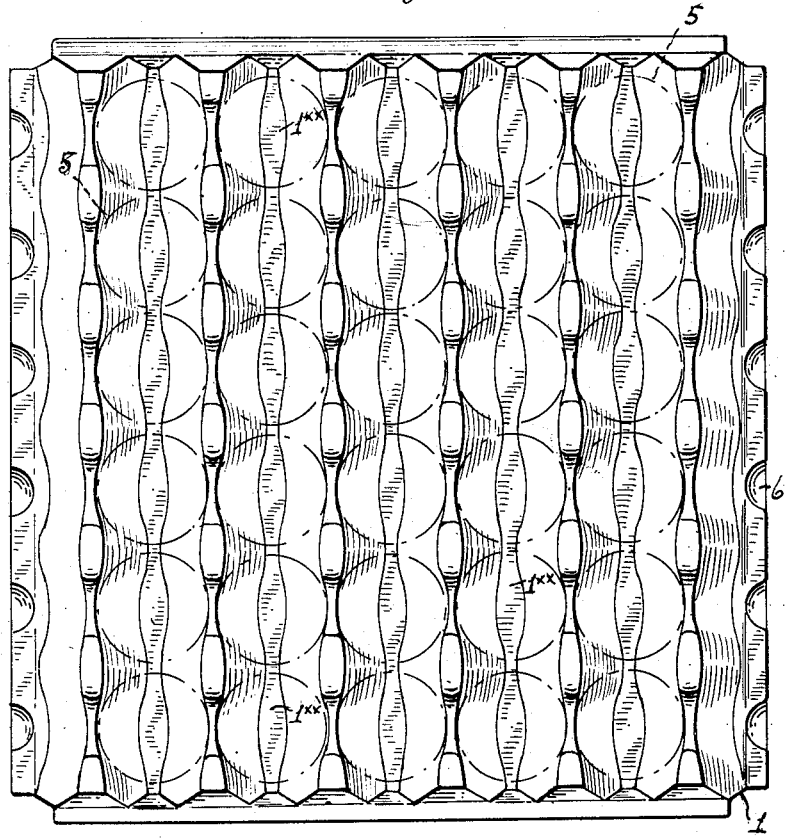
Fig. 1 is a plan view of an embodiment comprising the invention.
Figure 2:
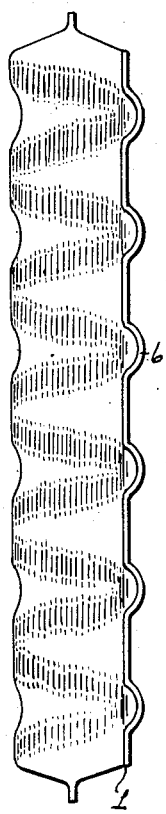
Fig. 2 is an end elevation of the same.

The alternate raised sections $1x$ may be of the curved formation $1xx$, Figs. 1 and 8, or, of uniform width as shown in Fig. 4, or, as reinforced by the transverse short rib formation 2 of Fig. 7.

Figure 3:
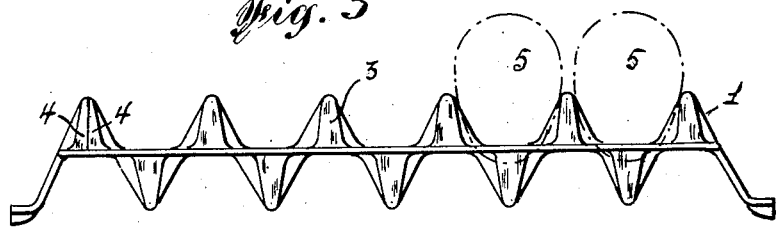
Fig. 3 is a side elevation of the structure shown in Fig. 1, two eggs being shown in dotted lines as supported by adjacent troughs.

Resistance against spreading of the sheet may further be provided by partially closing the troughs at the ends of the sheet, as shown in Fig. 3, at 3. When the structure is formed of molded pulp, the members 3 will be molded integrally with the corrugated sheet formation and when the structure is formed by rolling sheet stock, integral flaps 4, Fig. 3, may be folded over and mutually secured in any suitable manner.

At opposite sides of the sheet, the latter may be formed with depressed finger channels to enable insertion of the fingers from above the sheet to a point below the same to enable convenient removal of a layer of eggs supported by the structure.

As shown in Figs. 5, 6 and 8, the assembly of a plurality of the structures comprises trough-like members alternately arranged so that the troughs of an overlying structure extend transversely of the troughs of an underlying structure. This is my preferred assembly because in such case there is no opportunity for the slipping of one or a plurality of troughs into an underlying trough or troughs and the consequent derangement of the egg pack, but a more important function of the assembly is that the opposed walls of an underlying trough support the egg at opposite lateral points and the walls of an overlying trough support the eggs at opposite points lying at right angles to the first-named points of support. The egg is thus held against lateral movement in any direction. This function is illustrated in the cross sectional view, Fig. 6, wherein the eggs indicated at 5 are shown supported by the walls, the lower trough walls $a$ and the transverse trough walls $b$.

Referring to the structure of Fig. 6, taken in conjunction with Fig. 8, it will be noted that the uppermost layer of eggs is laterally offset from the immediately underlying layer; this alternating arrangement following through the entire egg packing. In the arrangement shown in Fig. 1, the structure is adapted to receive five rows of six eggs each in one direction or six rows of five eggs each in a transversely extending direction. When a second like sheet is turned at right angles, it will present at its lower wall egg-receiving cavities, in number and location the same as the first named sheet. Therefore, the sheets may be alternately turned to bring opposed troughs into crosswise relationship as illustrated in Fig. 5 and maintain the registration of aligned egg-receiving compartments provided by an underlying and an overlying structure through the egg pack as a whole which generally comprises six layers of eggs held by seven of the combined flat and filler structures. It is unnecessary to form apertures in the corrugations, and each sheet formation may be the same as that used below and above it.

Having described my invention, what I claim and desire to secure by Letters Patent, is as follows:

1. A combined flat and filler structure comprising a waved sheet forming parallel upper and lower troughs, the side-walls of the troughs being of wave formation, the wave depressions at one side-wall of each trough being in register with corresponding wave depressions in the opposite side-wall, said depressions forming egg-receiving cavities, the sheet also being waved at the juncture line intermediate two parallel troughs, said juncture-line waves being at right angles to the waves of the trough side-walls.

2. A packing for eggs comprising two uniformly dimensioned sheets each having straight opposite side edges and parallel rows of troughs extending between said straight side edge portions and at substantially right angles thereto, the side-walls of the troughs being of wave formation, the wave depressions at one side-wall of each trough being in register with corresponding wave depressions in the opposite sidewall, said depressions forming egg-receiving cavities, the cavities at the top of the structure alternating with similar cavities at the bottom of the structure, each trough toward its base being of less area than a normal egg so that an egg received therein is held projected from the base of the trough, and the egg-supporting area of each trough being adapted to receive approximately one-half of a normal egg placed endwise in the trough, the two sheets being superposed with the trough of one at right angles to the other to receive parallel rows of eggs, for support of each egg at opposite sides by the opposed trough walls of one sheet and angularly of said sides by the opposed walls of the second sheet.

3. A packing for eggs comprising a plurality of sheets each sheet being of substantially uniform dimensions and so formed as to individually provide a plurality of parallel upwardly facing troughs and a plurality of parallel downwardly facing troughs, there being an even number of troughs in one face and an odd number of troughs in the opposite face of each sheet and each trough having generally converging side walls and side-wall juncture-ridges and said sheets being successively superimposed one upon the ridges of another with the troughs of one extending at right angles with the troughs of another, whereby the juncture-ridges of a series of parallel downwardly facing troughs of one sheet rest on and run transversely of the juncture-ridges of the series of parallel upwardly facing troughs of the next adjacent sheet therebelow to vertically and laterally support eggs placed therebetween.

4. The structure recited in claim 3 characterized in that each trough side-wall juncture-ridge is waved to form crests and depressions and the superimposed sheets are arranged so that the trough side-wall juncture-ridges of successive sheets contact at cooperating crests in said ridges.

5. The structure recited in claim 3 characterized in that each side-wall of each trough is waved so that the waved depressions in one side-wall of each trough is in register with corresponding depressions in the opposite side-wall, said depressions forming in said side walls an even number of egg receiving cavities on one side and an odd number on the opposite side of each sheet, and end wall means connecting the ends of each trough for laterally supporting the egg receiving portions thereof.

6. The structure recited in claim 3 characterized in that means are provided in each trough for properly spacing apart the eggs to be held therein as well as for holding the eggs projected an appropriate distance from the bottom of the troughs and characterized further in that means are also provided at the ends of each trough for closing same off.

7. A packing for eggs and like articles comprising combined flat and filler sheets of uniform dimensions adapted to be arranged in superposed relationship with their margins in vertical alignment, each of said sheets being formed with a plurality of rows of corrugations, the inclined walls of which are oppositely depressed at intervals to provide on one side of the sheet an odd number of valleys and an even number of pockets in each valley, and on the opposite side of the sheet an even number of valleys and an odd number of pockets in each valley, whereby the pocket-forming portions of superimposed sheets will cooperate to vertically and laterally support a uniform number of articles between successive sheets positioned with their corrugations extending at right angles to each other.

FERDINAND KRONENBERGER.